(12) United States Patent
Oh et al.

(10) Patent No.: US 11,305,476 B2
(45) Date of Patent: Apr. 19, 2022

(54) MANUFACTURING DEVICE OF BATTERY CASE HAVING IMPROVED MANUFACTURING PROCESSABILITY AND MANUFACTURING METHOD USING THE SAME

(71) Applicant: LG Chem, Ltd., Seoul (KR)

(72) Inventors: Sei Woon Oh, Daejeon (KR); Hyun Min Kim, Daejeon (KR); Sun Hwak Woo, Daejeon (KR); Yeo Kyung Yoon, Daejeon (KR); Eun Ju Lee, Daejeon (KR); Ji Eun Lee, Daejeon (KR); Soo Ji Hwang, Daejeon (KR)

(73) Assignee: LG Energy Solution, Ltd.

( * ) Notice: Subject to any disclaimer, the term of this patent is extended or adjusted under 35 U.S.C. 154(b) by 770 days.

(21) Appl. No.: 15/762,786

(22) PCT Filed: Mar. 13, 2017

(86) PCT No.: PCT/KR2017/002651
§ 371 (c)(1),
(2) Date: Mar. 23, 2018

(87) PCT Pub. No.: WO2017/160030
PCT Pub. Date: Sep. 21, 2017

(65) Prior Publication Data
US 2018/0264708 A1    Sep. 20, 2018

(30) Foreign Application Priority Data

Mar. 17, 2016  (KR) .................. 10-2016-0032092

(51) Int. Cl.
*B29C 51/10*    (2006.01)
*B29C 49/22*    (2006.01)
(Continued)

(52) U.S. Cl.
CPC .............. *B29C 51/10* (2013.01); *B29C 49/22* (2013.01); *B29C 49/78* (2013.01); *B29C 51/002* (2013.01);
(Continued)

(58) Field of Classification Search
None
See application file for complete search history.

(56) References Cited

U.S. PATENT DOCUMENTS 5,074,770 A * 12/1991 Graefe ................ B29C 44/1233
                                                    425/117
5,745,971 A    5/1998 Ohsawa et al.
(Continued)

FOREIGN PATENT DOCUMENTS

CN    102112279 A    6/2011
CN    102420291 A    4/2012
(Continued)

OTHER PUBLICATIONS

Translation of JPH1145688A.*
(Continued)

*Primary Examiner* — Alison L Hindenlang
*Assistant Examiner* — Asha A Thomas
(74) *Attorney, Agent, or Firm* — Lerner, David, Littenberg, Krumholz & Mentlik, LLP (57) ABSTRACT

The present invention provides a manufacturing device of a battery case including a first mold including a first space part having a shape corresponding to a storage part formed therein; a second mold including a second space part having a shape corresponding to the storage part and a through-hole communicating with the second space part formed therein, and coupled to the first mold with a laminate sheet interposed therebetween; and an air pressure regulator mounted in the through-hole in a state in which the first space part and
(Continued)

the second space part are isolated from the outside, and increasing or decreasing an air pressure of the second space part through the through-hole to stretch and modify the laminate sheet into a shape corresponding to the first space part or the second space part.

9 Claims, 5 Drawing Sheets (51) Int. Cl.
*B29C 49/78* (2006.01)
*B29C 51/00* (2006.01)
*B29C 51/36* (2006.01)
*B29C 51/46* (2006.01)
*H01M 50/10* (2021.01)
*B29C 51/40* (2006.01)
*B29L 31/00* (2006.01)
*B29L 9/00* (2006.01)
*B29C 51/14* (2006.01)
*B29K 23/00* (2006.01)
*B29K 67/00* (2006.01)
*B29K 77/00* (2006.01)
*B29L 31/34* (2006.01)

(52) U.S. Cl.
CPC .............. *B29C 51/36* (2013.01); *B29C 51/46* (2013.01); *H01M 50/10* (2021.01); *B29C 51/14* (2013.01); *B29C 51/40* (2013.01); *B29K 2023/00* (2013.01); *B29K 2067/003* (2013.01); *B29K 2077/00* (2013.01); *B29K 2827/18* (2013.01); *B29K 2995/0067* (2013.01); *B29K 2995/0069* (2013.01); *B29L 2009/003* (2013.01); *B29L 2031/3468* (2013.01); *B29L 2031/7146* (2013.01); *H01M 2220/30* (2013.01)

(56) References Cited

U.S. PATENT DOCUMENTS

| 8,893,526 | B2* | 11/2014 | Liu | C03B 40/00 |
| | | | | 65/94 |
| 2011/0163485 | A1 | 7/2011 | Tea | |
| 2013/0256956 | A1 | 10/2013 | Kim et al. | |
| 2013/0313762 | A1* | 11/2013 | Katou | G01R 19/145 |
| | | | | 264/549 |
| 2014/0304980 | A1 | 10/2014 | Kim et al. | |
| 2015/0217487 | A1 | 8/2015 | Louie et al. | |
| 2016/0087252 | A1 | 3/2016 | Hong et al. | |

FOREIGN PATENT DOCUMENTS

| CN | 103282179 | A | 9/2013 |
| CN | 103817916 | A | 5/2014 |
| CN | 203805300 | U | 9/2014 |
| CN | 104303330 | A | 1/2015 |
| DE | 102010013450 | A1 | 10/2011 |
| JP | H1145688 | A | 2/1999 |
| JP | 2006172879 | A | 6/2006 |
| JP | 2009233960 | A | 10/2009 |
| JP | 2010192154 | A | 9/2010 |
| JP | 2012210807 | A | 11/2012 |
| KR | 2019990011663 | U | 3/1999 |
| KR | 20090076674 | A | 7/2009 |
| KR | 20110125554 | A | 11/2011 |
| KR | 101227098 | B1 | 1/2013 |
| KR | 20130102329 | A | 9/2013 |
| KR | 20130131522 | A | 12/2013 |
| KR | 20140025188 | A | 3/2014 |
| KR | 20140144843 | A | 12/2014 |
| KR | 20150062195 | A | 6/2015 |
| KR | 20150091980 | A | 8/2015 |
| KR | 20160000646 | A | 1/2016 |
| WO | 2011124351 | A1 | 10/2011 |

OTHER PUBLICATIONS

Translation of KR20150062195A.*
Chinese Search Report for Application No. CN 201780003624.0 dated Jul. 12, 2019, 1 page.
Database WPI Week 199917 for AN1999-200985 from Thomson Scientific, London, GB, dated 2017.
Extended European Search Report including Written Opinion for EP17766931 dated Oct. 18, 2018.
International Search Report for Application No. PCT/KR2017/002651 dated Apr. 28, 2017.
European Search Report for Application No. 17766931.4 dated Mar. 12, 2020, 2 pages.
Mo, et al., "7.2 Vacuum forming process and mold design," Plastic Forming Process and Mold Design, Jan. 2011, pp. 321-327, Central South University Press, Changsha, China. English Translation of Abstract included only.

* cited by examiner

MANUFACTURING DEVICE OF BATTERY CASE HAVING IMPROVED MANUFACTURING PROCESSABILITY AND MANUFACTURING METHOD USING THE SAME

CROSS-REFERENCE TO RELATED APPLICATIONS

The present application is a national phase entry under 35 U.S.C. § 371 of International Application No. PCT/KR2017/002651, filed Mar. 13, 2017, which claims priority to and the benefit of Korean Patent Application No. 10-2016-0032092 filed in the Korean Intellectual Property Office on Mar. 17, 2016, the disclosures of which are incorporated herein by reference.

TECHNICAL FIELD

The present invention relates to a manufacturing device of a battery case having improved manufacturing processability and a manufacturing method using the same.

BACKGROUND

As technology development and demand for mobile devices increase, the demand for secondary batteries as energy sources is rapidly increasing. In particular, among the secondary batteries, a number of researches and commercialization of a lithium secondary battery having a high energy density and a discharge voltage have been conducted.

Typically, in view of a shape of the battery, there is a high demand for a prismatic secondary battery and a pouch type secondary battery that are applicable to products such as mobile phones, etc., due to a thin thickness, and in view of a material of the battery, there is a high demand for lithium secondary batteries such as a lithium ion battery and a lithium ion polymer battery having high energy density, discharge voltage, and output stability.

The secondary battery may be classified into a cylindrical battery cell, a prismatic battery cell, and a pouch type battery cell, etc., depending on its shape. Of these, the pouch type battery cell that is capable of being stacked with a high degree of integration, has a high energy density per unit weight, is inexpensive, and is easy to be modified are attracting much attention.

The pouch type secondary battery includes a flexible laminate sheet as a battery case, and has a structure in which an electrode assembly and an electrolyte solution are embedded in a storage space molded in an electrode assembly shape on the laminate sheet.

Meanwhile, the secondary battery is also used as the energy source gradually even in fields where large-capacity electric power is required, such as electric vehicles, hybrid vehicles, and electric power storage devices, etc., as well as small-sized mobile devices or household appliances, or the like. Accordingly, the demand for the secondary battery having a large capacity is drastically increased as compared to the conventional secondary battery having a small capacity.

A charge/discharge capacity of the secondary battery is proportional to an area of an electrode plate and the number of electrode plates. As the area and the number of the electrode plates are increased, a thickness of the electrode assembly is increased.

Corresponding to this, a shape of the battery case is also required to have a storage part having a deep depth so that the electrode assembly having a relatively thick thickness is stored.

Generally, a method in which the laminate sheet is stretched to a desired depth by using a punch that presses the sheet downward in a state in which the storage part fix the laminate sheet, is used.

However, due to a limit of flexibility of the laminate sheet and frictional force applied when the sheet is pressed by the punch, there are problems that appearance defects such as pin-holes, cracks, or the like, occur on an outer surface of the stretched laminate sheet at a predetermined depth or more, and accordingly, it is difficult to form the depth of the storage part deeply so that the electrode assembly having a large capacity is capable of being accommodated.

Therefore, there is a high need for a manufacturing device of a battery case that is capable of overcoming the above-described technical problem, i.e., that is capable of forming the depth of the storage part deeply without causing the appearance defects.

Technical Problem

The present invention aims to solve the above-described problems of the conventional art and technical problems required from the past.

In detail, the present invention has been made in an effort to provide a manufacturing device having advantages of minimizing frictional force at the time of forced stretching of a laminate sheet, and specifically, provide a manufacturing device and a manufacturing method having advantages of manufacturing a battery case having a desired shape and quality by inducing stretching of the laminate sheet by an air pressure instead of a pressurizing means such as a punch for inducing forced stretching in a state of being in contact with the laminate sheet.

Technical Solution

An exemplary embodiment of the present invention provides a manufacturing device of a battery case in which a storage part for mounting an electrode assembly for a secondary battery is formed on a laminated sheet, the manufacturing device including:

a first mold including a first space part having a shape corresponding to the storage part formed therein;

a second mold including a second space part having a shape corresponding to the storage part and a through-hole communicating with the second space part formed therein, and coupled to the first mold with the laminate sheet interposed therebetween; and an air pressure regulator mounted in the through-hole in a state in which the first space part and the second space part are isolated from the outside, and increasing or decreasing an air pressure of the second space part through the through-hole to stretch and modify the laminate sheet into a shape corresponding to the first space part or the second space part.

Since the manufacturing device induces stretching of the laminate sheet in accordance with increase or decrease in air pressure, the frictional force applied to the laminate sheet during the stretching process may be remarkably low as compared to a structure in which the laminate sheet is pressed in a direct contact state, for example, a deep drawing method using a punch, thereby preventing defects such as cracks and pinholes and stretching the laminate sheet in the form of a storage part having a deeper depth.

Further, in the structure, since complicated pressurizing means such as a punch and a hydraulic cylinder for lifting the punch may be omitted, the manufacturing device may be constituted in a relatively compact structure, and based on this, it is possible to provide economic advantages in view of facility design and maintenance.

In the manufacturing device according to the present invention, a coating layer for reducing frictional force with the laminate sheet may be added to an inner surface of the first and second space parts. For example, the coating layer may be a Teflon resin having a friction coefficient of 0.03 to 0.04.

Generally, the laminate sheet has a characteristic of a soft packaging material to be excellent in stretchability against an external force, but has a low mechanical rigidity. For this reason, the frictional force is formed on the stretched laminate sheet in a state in which the laminate sheet is in close contact with each of the space parts which are inner surfaces of the first and second molds.

Since the frictional force acts as a load on the stretched laminate sheet, a lower flexibility than an inherent flexibility of the laminate sheet is formed at a portion where the laminate sheet and the inner surface of the space parts are in close contact with each other.

Accordingly, when a pressing force stronger than the flexibility formed by the frictional force is applied, the sheet may be forcibly stretched but the crack may occur on the outer surface.

For this reason, it is difficult to set the air pressure for inducing the stretching of the laminate sheet to be large, and substantially, in consideration of the fact that the depth of the storage part is determined by the pressing force by the air pressure, a range of the air pressure should be set within a range where no crack occurs.

Accordingly, in the manufacturing device according to the present invention, at the time of pressing, the coating layer having a relatively low friction coefficient is formed on the inner surfaces of the first space part and the second space part that are in close contact with the laminate sheet, and thus it is possible to minimize deterioration in flexibility inherent to the sheet at a portion where the laminate sheet and the punch are in close contact with each other, thereby forming the depth of the storage part relatively deeply while suppressing the occurrence of crack.

Hereinafter, a structure in which the first mold, the second mold, and the storage part are formed is described in further detail with reference to the following non-limiting examples.

In one specific example, the first mold may include first fixing parts that are in close contact with a lower surface of the laminate sheet along an outer periphery adjacent to a portion for forming the storage part in the laminate sheet;

the second mold may include second fixing parts that are in close contact with an upper surface of the laminate sheet along an outer periphery adjacent to a portion for forming the storage part in the laminate sheet; and the first space part and the second space part may be isolated from the outside in a state in which the laminate sheet is fixed between the first fixing parts and the second fixing parts.

In addition, as described above, the first space part and the second space part may be isolated from each other by the laminate sheet in a state in which the laminate sheet is fixed between the first fixing parts and the second fixing part.

Therefore, the laminate sheet positioned in the first space part and the second space part may be isolated from the outside, and in particular, may be modified correspondingly when the air pressure in the second space part is changed.

In one specific example, the air pressure regulator may decrease an air pressure of the second space part through the through-hole, and the laminate sheet may be modified into a shape corresponding to the second space part while being stretched in a direction of the second space part in response to the decrease in pressure of the second space part.

In this structure, the air pressure of the second space part becomes lower than the air pressure of the first space part, and the laminate sheet moves in the direction of the second space part based on the first space part. At this time, the laminate sheet is slowly stretched and is molded in a shape in which the laminate sheet is in close contact with the inner surface of the second space part.

Here, a degree of the decrease in pressure of the second space part through the air pressure regulator may be set in consideration of a thickness of the laminate sheet and a desired depth of the storage part. However, when the degree of the decrease in pressure is set to be excessively high in order to simply increase a volume and a depth of the storage part, defects such as cracks and pinholes on the sheet surface may be caused due to excessive stretching and frictional force on the laminate sheet, the through-hole may be sealed by a portion of the laminate sheet before being molded in a desired storage part form.

In addition, the laminate sheet includes a resin layer and a metal layer, due to a characteristic of a material, when sheet is excessively thin, a small amount of moisture particles may be transmitted through the resin layer. In particular, the transmission phenomenon may be promoted at a portion where the thickness is relatively thinned due to the stretching.

Accordingly, it is preferable that the laminate sheet has a thickness capable of securing reliability with respect to moisture even in the state that the laminate sheet is stretched.

Accordingly, the present inventors found that at the time of decreasing the pressure by sucking air at a pressure of $10 \times 10^5$ dyn/cm$^2$ to $99 \times 10^5$ dyn/cm$^2$ by the air pressure regulator, the previously described two conditions may be satisfied, that is, the reliability of moisture permeation through the storage part may be secured without causing defects and through-hole blocking caused by excessive stretching of the laminate sheet.

In some cases, the decreasing in pressure of the second space part may be progressively performed from a relatively high pressure to a low pressure satisfying the above-described pressure range.

Meanwhile, a vertical cross-sectional area of the through-hole through which the air flows may have a size of 0.01% to 5% compared to a total area of the laminated sheet positioned in the second space part before the decrease in pressure.

When the vertical cross-sectional area is less than the above range, an excessive suction pressure may be formed in the through-hole, and the laminate sheet adjacent to the through-hole may be torn. When the vertical cross-sectional area is more than the above range, a portion to be further stretched through the through-hole in the laminate sheet may be formed relatively wide, and a shape of the through-hole may be formed in the laminate sheet, and thus the storage part may not be molded in a desired form.

As described above, a plurality of through-holes satisfying the size range may be formed in the second mold so as to prevent the laminate sheet in an undesired form due to the through-hole from being molded, and to prevent the sheet from being damaged.

In another specific example, the air pressure regulator may increase the air pressure of the second space part, and the sheet may be modified into a shape corresponding to the first space part while being stretched in a direction of the first space part in response to the air pressure formed in the second space part.

In this structure, the air pressure of the second space part becomes higher than the air pressure of the first space part, and the laminate sheet moves in the direction of the first space part based on the second space part. At this time, the laminate sheet is slowly stretched and is molded in a shape in which the laminate sheet is in close contact with the inner surface of the first space part.

Here, similar to the above-described decrease in pressure, the air pressure regulator may increase a pressure in a pressure range in which reliability with respect to moisture permeation through the storage part may be secured without causing excessive stretching of the laminate sheet and through-hole blocking, and specifically, may increase the pressure by introducing air at a pressure of $10\times10^5$ dyn/cm$^2$ to $99\times10^5$ dyn/cm$^2$.

In some cases, the decrease in pressure of the second space part may be progressively performed from a relatively low pressure to a high pressure satisfying the above-described pressure range.

The laminate sheet in the present invention means a sheet composed of an upper layer of a polymer resin, an intermediate layer of a barrier metal, and a lower layer of a polymer resin.

The upper layer of the polymer resin is a resin layer forming the outer surface of the battery case, and is required to have tensile strength and weather resistance having a predetermined level or more so as to have excellent resistance to external environment. In this respect, polyethylene terephthalate (PET) and stretched nylon film may be used as the polymer resin of the outer layer of the resin.

The lower layer of the polymer resin may be preferably formed of a polyolefin-based resin that has heat fusion property (heat adhesive property) and low hygroscopicity to suppress penetration of an electrolyte solution, and that is not swollen or eroded by the electrolyte solution.

Aluminum may be used as the intermediate layer of the barrier metal so as to improve strength of a cell case in addition to prevent the inflow or outflow of foreign substances such as gas, moisture, and the like.

In general, the barrier metal plays a dominant role in the stretching of the laminate sheet.

Specifically, as the thickness of the barrier metal is increased, a range in which the laminate sheet is capable of being stretched may be relatively wide. However, when the thickness thereof is excessively increased, flexibility may be deteriorated due to rigidity of the thicker barrier metal.

On the contrary, as the thickness of the barrier metal is thinner, the range in which the laminate sheet is capable of being stretched may be relatively narrow, but the mechanical rigidity of the thin barrier metal may be low, and thus the flexibility may be increased.

In particular, in the deep drawing method using a punch, molding of the laminate sheet is performed by instantaneous pressing of the punch, and thus it is advantageous for the thickness of the barrier metal to be thick for mechanical rigidity, wherein the thickness may be from about 50 micrometers to about 150 micrometers. However, since the manufacturing cost is greatly increased as the thickness of the barrier metal is increased, the deep drawing method has an economical disadvantage.

On the other hand, in the present invention, the stretching of the laminate sheet is slowly induced by using the air pressure, and thus the thickness of the barrier metal is preferably relatively thin. For this reason, the present invention has an economical advantage compared to the deep drawing method. Accordingly, in the present invention, the thickness of the barrier metal may be 15 micrometers to 50 micrometers, and more specifically 25 micrometers to 50 micrometers.

When the thickness of the barrier metal is less than 15 micrometers, the stretching range may be narrow, and thus the metal may break during the stretching process. When the thickness thereof is more than the above range, it is not preferable since the stretching to air pressure is not available.

Another embodiment of the present invention provides a manufacturing method for forming a storage part for mounting an electrode assembly for a secondary battery on a laminate sheet.

The manufacturing method specifically includes, disposing the laminate sheet between a first mold and a second mold, and coupling the first mold and the second mold in a form in which a first space part formed in the first mold and a second space part formed in the second mold are isolated from each other;

changing a pressure of the second space part by a through-hole communicating with the second space part of the second mold and an air pressure regulator coupled to the through-hole; and stretching the sheet in a shape corresponding to the first space part or the second space part in response to a pressure change of the second space part.

That is, the method according to the present invention induces the stretching of the laminate sheet by changing the air pressure in an isolated space. Thus, the frictional force applied to the laminate sheet during the stretching process may be remarkably low as compared to the general deep drawing method, and accordingly, the laminate sheet may be stretched to a deep depth, thereby providing excellent advantages in view of manufacturing processability.

In this method, the pressure change may be performed by selecting a process of decreasing a pressure by sucking air in the second space part by the air pressure regulator, or a process of increasing the pressure by introducing air into second space part by the air pressure regulator.

The decreasing of the pressure may be gradationally performed by a primary decrease in pressure with a pressure of $10\times10^5$ dyn/cm$^2$ to $60\times10^5$ dyn/cm$^2$ at an atmospheric pressure, and a secondary decrease in pressure with a pressure of 110% to 400% compared to the pressure of the primary decrease in pressure.

Similar to this, the increasing of the pressure may be gradationally performed by a primary increase in pressure with a pressure of $10\times10^5$ dyn/cm$^2$ to $60\times10^5$ dyn/cm$^2$ at an atmospheric pressure, and a secondary increase in pressure with a pressure of 110% to 400% compared to the pressure of the primary increase in pressure.

This is intended to gradually induce the stretching of the laminate sheet to increase dimensional accuracy of the storage part, and simultaneously, to prevent defects such as cracks and pinholes that may occur when the laminate sheet is stretched in a short time.

Further, the increase in pressure and the decrease in pressure by stages may induce relatively uniform stretching of each portion of the laminate sheet, for example, a portion that is positioned in the first space and the second space and is directly pressurized by the air pressure, and a portion engaged between the first mold and the second mold, and thus the thickness of the storage part may be uniformly formed.

Yet another embodiment of the present invention provides a battery case including the storage part formed by the manufacturing method as described above.

The storage part of the battery case may include an electrode assembly and an electrolyte solution embedded therein, and in this state, an outer circumferential portion of the battery case may be heat fused and sealed to form a secondary battery.

DETAILED DESCRIPTION OF THE EMBODIMENTS

Hereinafter, the present invention will be described with reference to the drawings according to Examples of the present invention, which is provided for a better understanding of the present invention, and thus, the scope of the present invention is not limited thereto.

Figure 1:
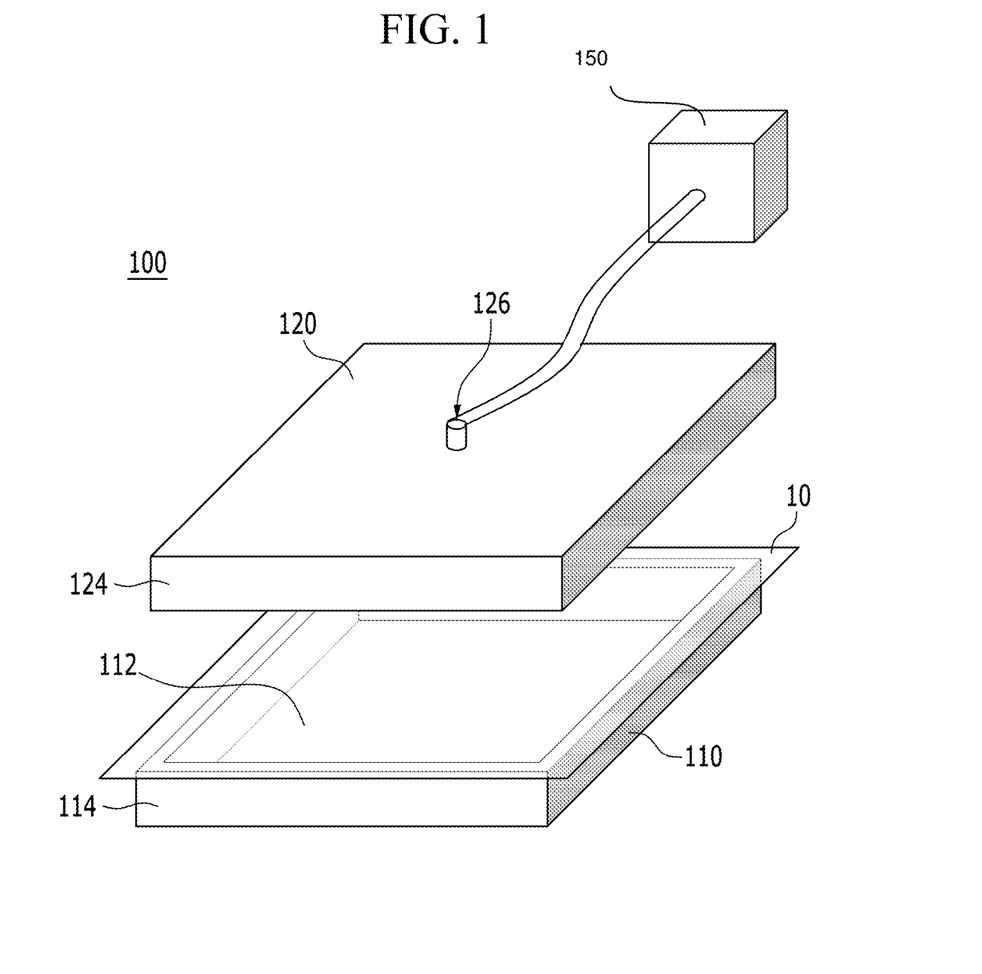
FIG. 1 is a schematic view of a manufacturing device according to an exemplary embodiment of the present invention.
Figure 2:
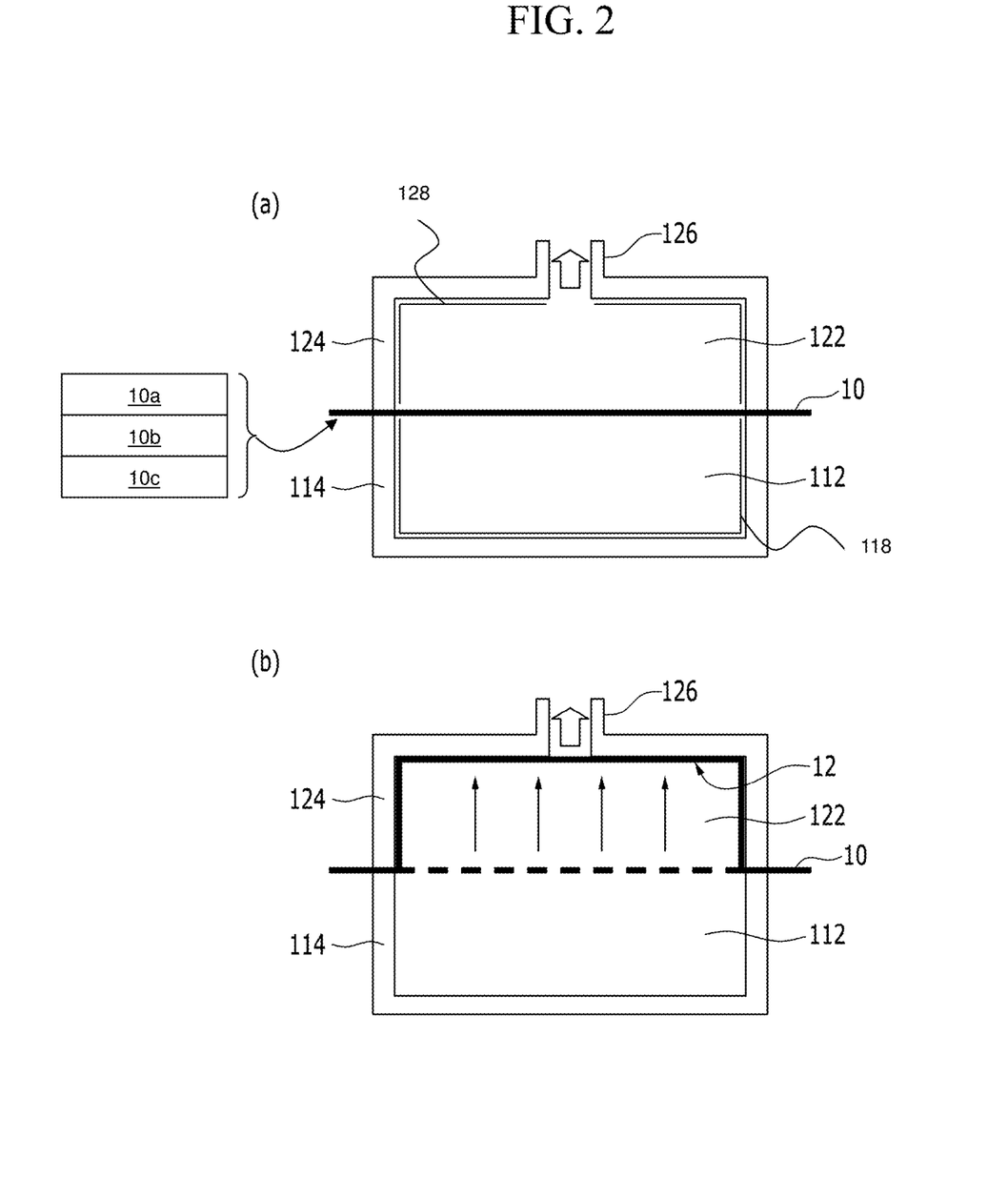
FIGS. 2 and 3 are vertical cross-sectional views of the manufacturing device.
Figure 3:
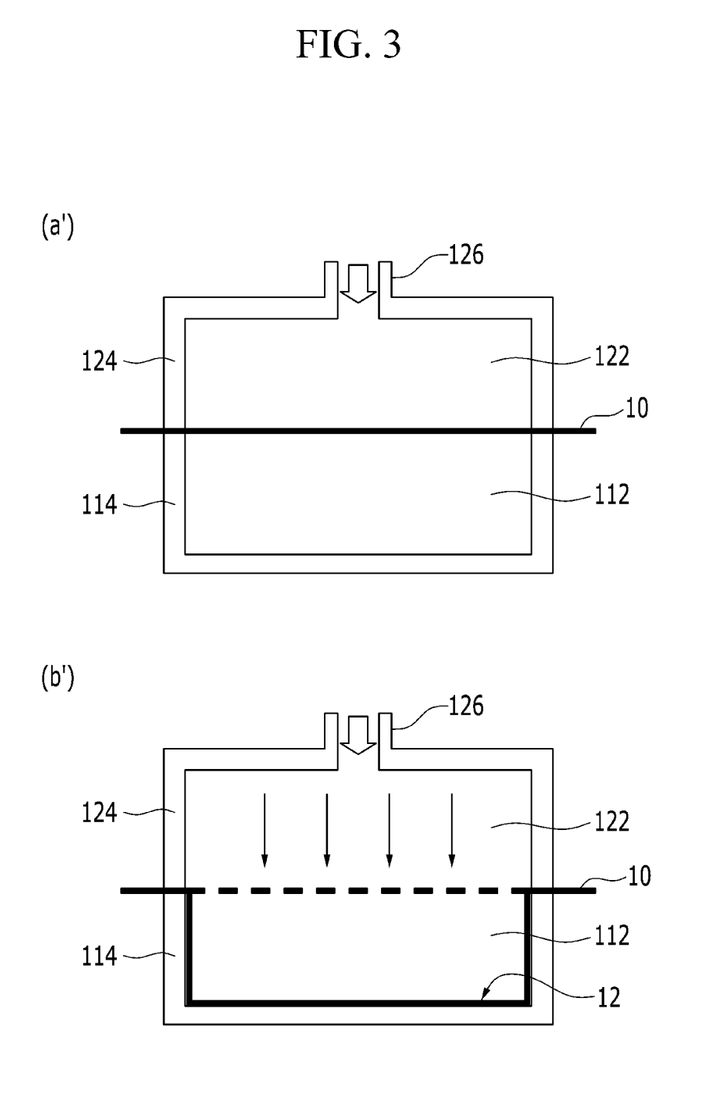

FIG. 1 is a schematic view of a manufacturing device according to an exemplary embodiment of the present invention, and FIGS. 2 and 3 are vertical cross-sectional views of the manufacturing device.

Referring to these drawings, the manufacturing device includes a first mold 110, a second mold 120, and an air pressure regulator 150 connected to the second mold 120.

The first mold 110 includes a first space formed in a shape corresponding to a shape of the storage part 12 in the battery case. The first mold 110 includes first fixing parts 114 that are in close contact with a lower surface of the laminate sheet 10 along an outer periphery adjacent to a portion for forming the storage part 12 in the laminate sheet 10. The laminate sheet 10 is composed of an upper layer 10a of a polymer resin, an intermediate layer 10b of a barrier metal, and a lower layer 10c of a polymer resin.

The second mold 120 includes a second space formed in a shape corresponding to a shape of the storage part 12 in the battery case.

The second mold 120 includes second fixing parts 124 that are in close contact with an upper surface of the laminate sheet 10 along an outer periphery adjacent to a portion for forming the storage part 12 in the laminate sheet 10.

The second mold 120 further includes a through-hole 126 communicating with the second space part 122 and has a structure in which the air pressure regulator 150 is connected to the through-hole 126.

A coating layer 118, 128 having a low friction coefficient is coated on inner surfaces of the first space and the second space so that the frictional force with respect to the laminate sheet 10 is reduced in the first space and the second space in the present invention.

The laminate sheet 10 is disposed between the first mold 110 and the second mold 120, and when the first fixing parts 114 and the second fixing parts 124 are coupled to face each other, and the laminate sheet 10 is fixed between the first mold 110 and the second mold 120 while being in close contact with the first fixing parts 114 and the second fixing parts 124.

Although not shown in the drawings, the coupling between the first mold 110 and the second mold 120 may be achieved by mechanical fastening means, such as a male or female fastening structure or a threaded fastening structure.

When the first mold 110 and the second mold 120 are coupled as described above, the first space part 112 and the second space part 122 are isolated from the outside, and only the second space communicates with the air pressure regulator 150 via the through-hole 126.

In addition, in the state in which the laminate sheet 10 is fixed between the first fixing parts 114 and the second fixing parts 124, the first space part 112 and the second space part 122 are isolated from each other based on the laminate sheet 10.

In this state, the laminate sheet 10 may be modified while being stretched in a direction of the first space part 112 or the second space part 122 according to a change in air pressure in the second space part 122.

In this regard, 3, FIGS. 2 and 3 schematically show a series of processes of forming the storage part 12 in the laminate sheet 10 using the change in air pressure in the second space part 122.

First, referring to FIG. 2A, the air pressure regulator 150 sucks air in the second space part 122 through the through-hole 126 to decrease the air pressure of the second space part 122.

In this state, the air pressure of the second space part 122 is lower than the air pressure of the first space part 112, and the laminate sheet 10 is slowly stretched while moving in the direction of the second space part 122 based on the first space part 112.

When the decrease in pressure is performed for a predetermined time, as shown in FIG. 2B, the laminate sheet 10 is molded in a state of being closely attached to the inner surface of the second space part 122 to form the storage part 12 having the shape of the second space part 122.

In FIG. 2, the second space part 122 has a rectangular structure on a vertical cross section, but may have an amorphous structure including a round shape or a protrusion and depression shape so that the storage part 12 is molded in various forms.

FIG. 3 shows a process of forming the storage part 12 by increasing the air pressure of the second space part 122, on the contrary to FIG. 2.

Referring to FIG. 3A', the air pressure regulator 150 introduces air into the second space part 122 through the through-hole 126 to increase the air pressure of the second space part 122.

In this state, the air pressure of the second space part 122 is higher than the air pressure of the first space part 112, and the laminate sheet 10 is slowly stretched while moving in the direction of the first space part 112 based on the second space part 122.

When the decrease in pressure is performed for a predetermined time, as shown in FIG. 2B', the laminate sheet 10 is molded in a state of being closely attached to the inner surface of the first space part 112 to form the storage part 12 having the shape of the first space part 112.

In FIG. 3, the first space part 112 has a rectangular structure on a vertical cross section, but may have an amorphous structure including a round shape or a protrusion and depression shape so that the storage part 12 is molded in various forms.

Further, although not shown separately in the drawing, when the laminate sheet 10 is stretched to the first space part 112, an opening through which air existing in the first space part 112 may be exhausted to the outside may be formed in the first space part 112.

Figure 4:
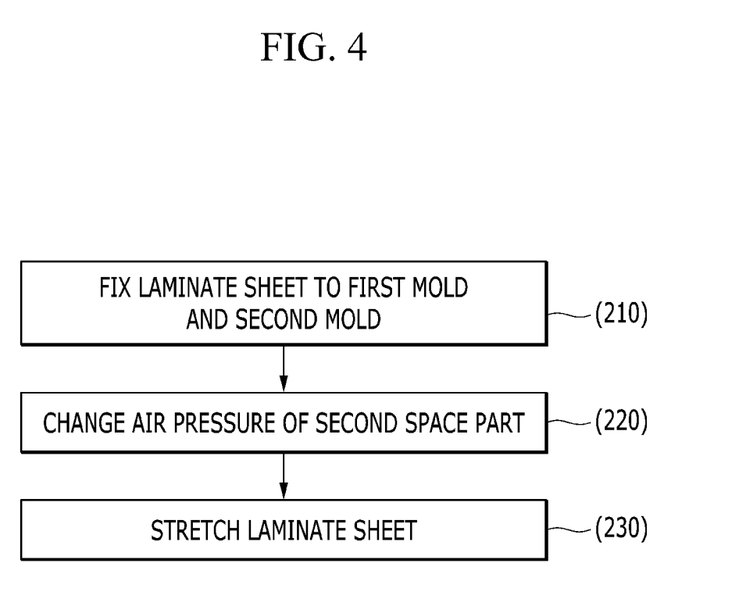
FIG. 4 is a flow chart of a manufacturing method according to an exemplary embodiment of the present invention.

FIG. 4 is a flow chart of a manufacturing method according to an exemplary embodiment of the present invention Referring to FIG. 4, first, in a process 210, the laminate sheet 10 is disposed between the first mold 110 and the second mold 120, and the first mold 110 and the second mold 120 are coupled in a form in which the first space part 112 formed in the first mold 110 and the second space 122 part formed in the second mold 120 are isolated from each other.

Here, the through-hole 126 communicating with the second space part 122 may be connected to the air pressure regulator 150, and thus the air pressure of the second space part 122 may be changed by the air pressure regulator 150. In the present invention, the air pressure regulator 150 is not particularly limited as long as it is a device capable of modifying the air pressure, and for example, may have a structure in which an air compressor and a vacuum motor are combined.

Thereafter, in a process 220, the pressure of the second space part 122 is changed by the air pressure regulator 150 to induce the stretching of the laminate sheet 10.

Here, the pressure change may be performed by selecting the process of decreasing a pressure by sucking air in the second space part 122 by the air pressure regulator 150, or the process of increasing the pressure by introducing air into second space part 122 by the air pressure regulator 150.

When the method of decreasing in pressure by sucking air in the second space part 122 is selected in the process 220, a primary decrease in pressure with a pressure of about $60 \times 10^5$ dyn/cm$^2$ at an atmospheric pressure, and a secondary decrease in pressure with a pressure of $90 \times 10^5$ dyn/cm$^2$ corresponding to about 150% compared to the pressure of the primary decrease in pressure may be gradationally performed.

In contrast, when the method of increasing in pressure by introducing air into the second space part 122 is selected in the process 220, a primary increase in pressure with a pressure of about $60 \times 10^5$ dyn/cm$^2$ at an atmospheric pressure, and a secondary increase in pressure with a pressure of $90 \times 10^5$ dyn/cm$^2$ corresponding to 150% compared to the pressure of the primary increase in pressure may be gradationally performed.

The gradational change in pressure may gradually induce the stretching of the laminate sheet 10 to increase dimensional accuracy of the storage part 12, and simultaneously, to prevent defects such as cracks and pinholes that may occur when the laminate sheet 10 is stretched in a short time.

Further, the gradational change in pressure may induce relatively uniform stretching of each portion of the laminate sheet 10, for example, a portion that is positioned in the first space and the second space and is directly pressurized by the air pressure, and a portion engaged between the first mold 110 and the second mold 120, and thus the thickness of the storage part 12 may be uniformly formed.

In the process 230, the laminate sheet 10 is stretched in a form corresponding to the first space part 112 or the second space part 122 in response to the pressure change of the second space part 122, and is molded in the storage part 12.

Figure 5:
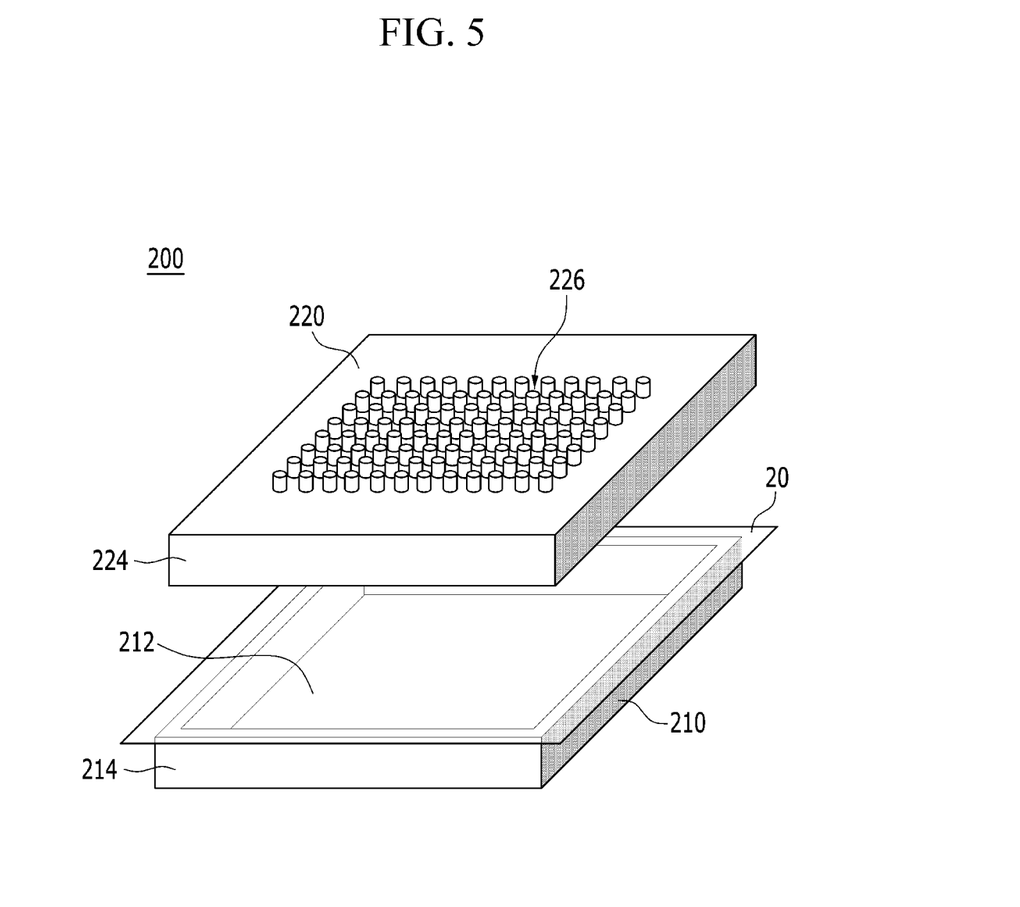
FIG. 5 is a schematic view showing a manufacturing device according to another exemplary embodiment of the present invention.

Meanwhile, FIG. 5 is a schematic view showing a manufacturing device according to another exemplary embodiment of the present invention.

The manufacturing device 200 shown in FIG. 5 has a structure similar to that of the manufacturing device shown in FIGS. 1 to 3, and has the same stretching process for the laminate sheet 20 as that of the manufacturing device. However, the manufacturing device is different in that a plurality of through-holes 226 are perforated in the second mold 220.

Specifically, the second mold 220 includes the plurality of through-holes 226 communicating with the second space part (not shown) and has a structure in which an outer surface of the second mold 220 except the through-holes 226 is isolated, and thus the second mold and the air pressure regulator 150 may be coupled to each other, and in some cases, each through-hole 226 may be connected to the air pressure regulator 150.

The vertical cross-sectional area of each through-hole 226 may have a size of about 1% or less compared to a total area of the laminated sheet 20 positioned in the second space part before the decrease in pressure.

This structure allows the suction pressure to be dispersed into the plurality of through-holes without concentrating on any one of the through-holes, thereby preventing the laminate sheet from being stretched through the through-hole or preventing excessive suction pressure from being formed with respect to each of the through-holes, and thus the laminate sheet is capable of being molded in a desired shape.

Hereinafter, the manufacturing device according to the present invention is described in detail with reference to Examples and Comparative Examples.

Example 1

In a state in which a laminate sheet having an area of 400 mm$^2$ was disposed between the first mold and the second mold, the laminate sheet was molded by decreasing an air pressure in the second mold using an air pressure regulator connected to a through-hole formed in the second mold.

Here, the air pressure regulator decreased the pressure with a pressure of $50 \times 10^5$ dyn/cm$^2$, a vertical cross-sectional area of the through-hole was 19.5 mm$^2$, a thickness of the laminate sheet was 30 micrometers, and a barrier metal of the laminate sheet was 15 micrometers.

Example 2

A laminate sheet was molded in the same manner as in Example 1 except that the air pressure regulator decreased the pressure with a pressure of $99 \times 10^5$ dyn/cm$^2$.

Example 3

A laminate sheet was molded by using the manufacturing device having the same structure and the same method as in Example 1 except that the vertical cross-sectional area of the through-hole was 3 mm$^2$.

Comparative Example 1

A laminate sheet was molded in the same manner as in Example 1 except that the air pressure regulator decreased the pressure with a pressure of $9 \times 10^5$ dyn/cm$^2$.

Comparative Example 2

A laminate sheet was molded in the same manner as in Example 1 except that the air pressure regulator decreased the pressure with a pressure of $110 \times 10^5$ dyn/cm$^2$.

Comparative Example 3

A laminate sheet was molded by using the manufacturing device having the same structure and the same method as in Example 1 except that the vertical cross-sectional area of the through-hole was 30 mm$^2$.

Experimental Example

Depths of storage parts of the laminated sheets molded in Examples 1 to 3 and Comparative Examples 1 to 3 were measured, and results are shown in Table 1 below.

TABLE 1

|  | Depth of storage part |
|---|---|
| Example 1 | 9.5 mm |
| Example 2 | 10.2 mm |
| Example 3 | 10.7 mm |
| Comparative Example 1 | 2.7 mm |
| Comparative Example 2 | Not measurable |
| Comparative Example 3 | Not measurable |

As shown in Table 1, when the laminate sheet was molded using the manufacturing device under the conditions according to Examples 1 to 3, the storage part was formed to have a depth at which the electrode assembly was capable of being stored.

On the other hand, in Comparative Example 2, a portion of the laminate sheet was torn and the depth was not measurable. It was thought that the tear of the laminate sheet occurred since the decrease in pressure was performed under relatively high pressure, resulting in excessive stretching of the laminate sheet.

Further, in Comparative Example 3, since the laminate sheet was hardly molded, the depth was not measurable. It was thought that the laminate sheet was hardly molded since sufficient vacuum pressure was not applied to the laminate sheet due to the relatively wide through-hole.

In Comparative Example 1, the depth of the storage part that was actually usable was not formed. Thus, it could be appreciated that the laminate sheet was not stored in a desired form under low pressure as in Comparative Example 1.

It will be understood by those skilled in the art that various modifications and change can be made in the scope of the present invention based on the above description.

INDUSTRIAL APPLICABILITY

As described above, since the manufacturing device and the manufacturing method according to the present invention induces stretching of the laminate sheet in accordance with increase or decrease in air pressure, the frictional force applied to the laminate sheet during the stretching process may be remarkably low as compared to a structure in which the laminate sheet is pressed in a direct contact state, for example, a deep drawing method using a punch, thereby preventing defects such as cracks and pinholes and stretching the laminate sheet in the form of a storage part having a deeper depth.

The invention claimed is:

1. An assembly comprising:
    a laminate sheet composed of an upper layer of a polymer resin, an intermediate layer of a barrier metal, and a lower layer of a polymer resin; and
    a manufacturing device of a battery case in which a storage part for mounting an electrode assembly for a secondary battery is formed on the laminate sheet, the manufacturing device comprising:
        a first mold including a first space part having a first shape corresponding to the storage part;
        a second mold including a second space part having a second shape matching the first shape and corresponding to the storage part, the second mold including a through-hole communicating with the second space part formed therein, and the second mold being coupled to the first mold, wherein a vertical cross-sectional area of the through-hole through which air flows has a size of 0.01% to 5% compared to a total area of the laminate sheet positioned in the second space part before a decrease in air pressure; and
        an air pressure regulator connected to the through-hole and configured to increase and decrease the air pressure of the second space part through the through-hole to stretch and modify the laminate sheet into a shape corresponding to the first space part and the second space part, respectively.

2. The assembly of claim 1, wherein:
    the first mold includes first fixing parts that are configured to be in close contact with a lower surface of the laminate sheet along an outer periphery adjacent to a portion for forming the storage part in the laminate sheet;
    the second mold includes second fixing parts that are configured to be in close contact with an upper surface of the laminate sheet along an outer periphery adjacent to a portion for forming the storage part in the laminate sheet; and
    the first space part and the second space part are isolated from the outside in a state in which the laminate sheet is fixed between the first fixing parts and the second fixing parts.

3. The assembly of claim 2, wherein: the first space part and the second space part are isolated from the each other by the laminate sheet in a state in which the laminate sheet is fixed between the first fixing parts and the second fixing parts.

4. The assembly of claim 1, wherein: the air pressure regulator sucks air with a pressure of $10 \times 10^5$ dyn/cm$^2$ to $99 \times 10^5$ dyn/cm$^2$ to decrease the pressure.

5. The assembly of claim 1, wherein: the air pressure regulator introduces air with a pressure of $10 \times 10^5$ dyn/cm$^2$ to $99 \times 10^5$ dyn/cm$^2$ to increase the pressure.

6. The assembly of claim 1, wherein: a coating layer for reducing frictional force with the laminate sheet is added to an inner surface of the first and second space parts.

7. The assembly of claim 6, wherein: the coating layer is a resin having a friction coefficient of 0.03 to 0.04.

8. An assembly comprising:
    a laminate sheet composed of an upper layer of a polymer resin, an intermediate layer of a barrier metal, and a lower layer of a polymer resin; and
    a manufacturing device of a battery case in which a storage part for mounting an electrode assembly for a secondary battery is formed on the laminate sheet, the manufacturing device comprising:

a first mold including a first space part having a first shape corresponding to the storage part formed therein;

a second mold including a second space part having a second shape matching the first shape and corresponding to the storage part, the second mold including a through-hole communicating with the second space part formed therein, and the second mold being coupled to the first mold, wherein a vertical cross-sectional area of the through-hole through which air flows has a size of 0.01% to 5% compared to a total area of the laminate sheet positioned in the second space part before a decrease in air pressure;

a coating layer for reducing frictional force with the laminate sheet added to an inner surface of the first and second space parts; and an air pressure regulator connected to the through-hole and configured to increase or decrease the air pressure of the second space part through the through-hole to stretch and modify the laminate sheet into a shape corresponding to the first space part or the second space part.

9. The assembly of claim 8, wherein: the coating layer is a resin having a friction coefficient of 0.03 to 0.04.

* * * * *